(12) United States Patent
Sohn et al.

(10) Patent No.: US 12,103,114 B2
(45) Date of Patent: Oct. 1, 2024

(54) LEAD-FREE SOLDER ALLOY COMPOSITION SUITABLE FOR USE IN HIGH-TEMPERATURE AND VIBRATION ENVIRONMENTS AND PREPARATION METHOD THEREOF

(71) Applicant: KYUNG DONG MTEC CO., LTD., Asan-si (KR)

(72) Inventors: Heung Rak Sohn, Seoul (KR); Bum Gyu Baek, Asan-si (KR); Song Hee Yim, Pyeongtaek-si (KR); Jun Tae Kim, Busan (KR)

(73) Assignee: KYUNG DONG MTEC CO., LTD., Asan-si (KR)

( * ) Notice: Subject to any disclaimer, the term of this patent is extended or adjusted under 35 U.S.C. 154(b) by 0 days.

(21) Appl. No.: 16/751,072

(22) Filed: Jan. 23, 2020

(65) Prior Publication Data
US 2020/0238443 A1    Jul. 30, 2020

(30) Foreign Application Priority Data
Jan. 24, 2019    (KR) .......................... 10-2019-0009505

(51) Int. Cl.
| | | |
|---|---|---|
| B23K 35/26 | (2006.01) | |
| B23K 35/02 | (2006.01) | |
| B23K 35/30 | (2006.01) | |
| B23K 35/36 | (2006.01) | |
| B23K 35/362 | (2006.01) | |
| B23K 35/40 | (2006.01) | |
| C22C 13/02 | (2006.01) | |

(52) U.S. Cl.
CPC ........ *B23K 35/262* (2013.01); *B23K 35/0227* (2013.01); *B23K 35/0244* (2013.01); *B23K 35/264* (2013.01); *B23K 35/3006* (2013.01); *B23K 35/302* (2013.01); *B23K 35/3601* (2013.01); *B23K 35/362* (2013.01); *B23K 35/40* (2013.01)

(58) Field of Classification Search
CPC .................................................. B23K 35/262
See application file for complete search history.

(56) References Cited

U.S. PATENT DOCUMENTS 5,965,197 A * 10/1999 Jin .......................... B23K 35/26
                                                           427/217
10,286,498 B2    5/2019 Sharma et al.
(Continued)

FOREIGN PATENT DOCUMENTS

| CN | 1555958 A | 12/2004 |
|---|---|---|
| CN | 105057911 A * | 11/2015 |

(Continued)

OTHER PUBLICATIONS

English translation of CN 105057911 (originally published Nov. 18, 2015), obtained from PE2E search.*

(Continued)

*Primary Examiner* — George Wyszomierski
(74) *Attorney, Agent, or Firm* — WTA Patents

(57) ABSTRACT

The present disclosure relates to a lead-free solder alloy composition in which a nanosized ceramic powder additive is added to a lead-free solder alloy of Sn—Cu—Bi, Sn—Ag—Bi or Sn—Ag—Cu—Bi, and a method for preparing the same.

6 Claims, 6 Drawing Sheets

(56) References Cited

U.S. PATENT DOCUMENTS

| | | | | |
|---|---|---|---|---|
| 2001/0002982 A1* | 6/2001 | Sarkhel | ................ | B23K 35/262 228/178 |
| 2007/0227627 A1* | 10/2007 | Suh | .......................... | C22C 1/03 148/400 |
| 2010/0200271 A1* | 8/2010 | Arvin | ..................... | H01B 13/00 977/932 |
| 2010/0294565 A1* | 11/2010 | Kawamata | ........... | B23K 35/262 228/101 |
| 2012/0223430 A1* | 9/2012 | Terashima | ........... | B23K 35/262 228/56.3 |
| 2016/0325384 A1* | 11/2016 | Liu | ........................ | H01L 24/11 |
| 2017/0225277 A1* | 8/2017 | Sharma | ................... | B23K 35/26 |
| 2019/0134758 A1* | 5/2019 | Hasnine | ............. | B23K 35/0227 |

FOREIGN PATENT DOCUMENTS

| | | | |
|---|---|---|---|
| CN | 106660178 A | | 5/2017 |
| CN | 113070605 A | * | 7/2021 |
| EP | 3184234 A1 | | 6/2017 |
| GB | 2421030 A | | 6/2006 |
| JP | 2002-020807 A | | 1/2002 |
| JP | 2008-521619 A | | 6/2008 |
| JP | 2014-527466 A | | 10/2014 |
| JP | 2015-020181 A | | 2/2015 |
| JP | 2017-528327 A | | 9/2017 |
| KR | 10-2017-0131280 A | | 11/2017 |
| WO | WO 2013/017885 A2 | | 2/2013 |
| WO | WO-2017200361 A2 | * | 11/2017 ............. B23K 35/26 |

OTHER PUBLICATIONS

English translation of CN 113070605 (originally published Jul. 6, 2021), obtained from PE2E search.*

Japanese Office Action, Japanese Patent Application No. 2020-010072, Feb. 2, 2021, eight pages.

Korean Office Action, Korean Patent Application No. 10-2019-0009505, Apr. 29, 2020, seven pages.

First Office Action, State Intellectual Property Office of People's Republic of China Patent Application No. 202010078028.2, Apr. 30, 2021, 31 pages.

Zeng e tal., "Indentation Creep Behavior of Sn—3.5Ag—2Bi—0.7Cu Lead-free Solder," Rare Metal Materials and Engineering, vol. 38, No. 8, Aug. 2009, p. 1353-1357.

Zeng e tal., "Indentation Creep Behavior of Sn—4.8Bi-0.7 Lead-free Solder," Journal of Xihua University (National Science Edition), vol. 29, No. 2, Mar. 2010, p. 69-72.

Zeng et al., "Indentation creep behavior of Sn—3.5Ag—2Bi lead-free solder," Chinese Journal of Nonferrous Metals, vol. 18, No. 4, Apr. 2008, p. 620-625.

* cited by examiner

LEAD-FREE SOLDER ALLOY COMPOSITION SUITABLE FOR USE IN HIGH-TEMPERATURE AND VIBRATION ENVIRONMENTS AND PREPARATION METHOD THEREOF

CROSS-REFERENCE TO RELATED APPLICATION

This application claims priority to Republic of Korea Patent Application No. 10-2019-0009505, filed on Jan. 24, 2019, the disclosure of which is incorporated herein by reference in its entirety.

BACKGROUND

Technical Field

The present disclosure relates to a general-purpose lead-free solder alloy composition capable of replacing a conventional lead-free solder and a method for preparing the same, and more particularly to a long-term-reliable lead-free solder alloy composition, which is suitable for use in high-temperature and vibration environments, has excellent wettability and low void coefficient, and exhibits high fatigue resistance in an operating temperature range, a method for preparing the same, and a solder paste, a solder preform, a solder ball, a solder wire and a solder bar, which includes the same.

Description of the Related Art

An Sn-37Pb solder, a typical solder alloy known in a conventional art, has a low melting point (melting point: 183° C.) and high mechanical properties, and thus has been universally used in industrial and household electronics and automotive electronic products. However, since the lead (Pb) component of the solder has been designated as an environmental pollutant that causes environmental pollution and is harmful to the human body, RoHS, WEEE, etc. were declared, restricting the use of the lead solder, and thus the use of the lead solder in the home appliance sector has been prohibited. In addition, the ELV regulations have been implemented in Europe, and the development of various lead-free solders has been made to replace the lead solder in automotive electronics.

In particular, various lead-free solder alloys, such as Sn—Cu-based alloys, Sn—Ag—Cu-based alloys, Sn—Bi-based alloys, and Sn—Zn-based alloys, have been developed. Among these lead-free solder alloys, a solder (melting point: 217° C.) having a composition of Sn-(0.1 to 3.5%) Ag-(0.5 to 0.7%) Cu has a good balance between wettability and strength, and thus has been widely used. However, it has poor wettability and soldering properties compared to an Sn-37Pb solder (melting point: 183° C.) which is a conventional lead solder, and a peak temperature profile of 250° C. or higher should be applied thereto in order to ensure a stable soldering yield. At this time, at a peak temperature of 250° C. or higher, an excessive intermetallic compound (IMC) layer may be created at the interface between solder joints. In particular, the conventional lead solder (Sn-37Pb) had good reliability for long-term use due to its good toughness resulting from lead (Pb). However, as it was converted to a lead-free solder, the shear strength was improved, whereas a problem arose in that the reliability is deteriorated due to poor toughness depending on the high-temperature and vibration environments of a PCB board.

In an attempt to solve this problem, Korean Patent Application Nos. 10-2014-0063662 A and 10-2017-0131280 A proposed multi-component alloy solders including, in addition to an Sn—Ag—Cu based solder alloy, Cu, Ag, Al, Au, Cr, In, Sb, Sc, Y, Zn, Ce, Co, Ge, Mn, Ni and Ti, and Korean Patent No. 10-1142814 proposed a solder paste capable of ensuring excellent reliability, which is a lead-free solder alloy having a reduced Ag content (0.05 to 2.0 wt %) and composed of Cu, Sb, Bi, In, Ge, and Co, with the remainder being Sn.

This method is a method of improving performance by increasing strength by precipitation-strengthened structures obtained by inducing precipitation strengthening through multi-component micro-alloying. However, precipitation-strengthened alloys have disadvantages in that the strength decreases rapidly with increasing temperature and in that during long-term use, the precipitation-strengthened grains disappear due to a difference in concentration or are coarsened by reaction with a matrix and cause cracks. In addition, these alloys have a problem in that the wettability is still poorer than that of lead solders, and thus voids occur.

SUMMARY

The present disclosure has been conceived to solve the above-described problems, and an object of the present disclosure is to provide a lead-free solder alloy composition suitable for use in high-temperature and vibration environments and a method for manufacturing the same, in which nanosized ceramic powder as an additive is added to a lead-free solder alloy, thereby improving toughness by structure refinement through nano-dispersion strengthening, and reducing the rate of strength decrease with increasing temperature.

Another object of the present disclosure is to provide a lead-free solder alloy composition and a method for preparing the same, in which an additive is used to suppress the growth of intermetallic compounds (IMC) with fatal brittleness, thereby reducing the occurrence of cracks and increasing the bonding strength of the alloy composition.

Yet another object of the present disclosure is to provide a solder paste, a solder preform, a solder ball, a solder wire and a solder bar, which are each composed of the lead-free solder alloy composition.

To achieve the above objects, the present disclosure provides a lead-free solder alloy composition suitable for use in high-temperature and vibration environments, the composition containing: a lead-free solder alloy of Sn-(0.1 to 10) wt % Cu-(0.1 to 10) wt % Bi, Sn-(0.1 to 10) wt % Ag-(1.0 to 10) wt % Bi, or Sn-(0.1 to 10) wt % Ag-(0.1 to 10) wt % Cu-(0.1 to 10) wt % Bi; and nanosized ceramic powder as an additive to the lead-free solder alloy.

In addition, the additive may include one or more selected from the group consisting of oxides, nitrides and carbides of boron (B), titanium (Ti), aluminum (Al), vanadium (V), chromium (Cr), manganese (Mn), iron (Fe), cobalt (Co), nickel (Ni), zirconium (Zr), niobium (Nb), molybdenum (Mo), yttrium (Y), lanthanum (La), tin (Sn), silicon (Si), silver (Ag), bismuth (Bi), copper (Cu), gold (Au), magnesium (Mg), palladium (Pd), platinum (Pt) or zinc (Zn).

Furthermore, the content of the additive may be 0.01 to 2.0 wt % based on the weight of the lead-free solder alloy composition.

In addition, the additive may have a size of less than 1,000 nm.

The present disclosure also provides a solder paste including: a lead-free solder alloy; an additive; and a flux.

The present disclosure also provides a solder preform formed using the lead-free solder alloy composition.

The present disclosure also provides a solder ball formed using the lead-free solder alloy composition.

The present disclosure also provides a solder wire formed using the lead-free solder alloy composition.

The present disclosure also provides a solder bar formed using the lead-free solder alloy composition.

The present disclosure also provides a method for preparing the lead-free solder alloy composition including: melting a lead-free solder alloy of Sn-(0.1 to 10) wt % Cu-(0.1 to 10) wt % Bi, Sn-(0.1 to 10) wt % Ag-(1.0 to 10) wt % Bi, or Sn-(0.1 to 10) wt % Ag-(0.1 to 10) wt % Cu-(0.1 to 10) wt % Bi; and adding nanosized ceramic powder as an additive to the melted lead-free solder alloy.

DESCRIPTION OF SPECIFIC EMBODIMENTS

Figure 1A:
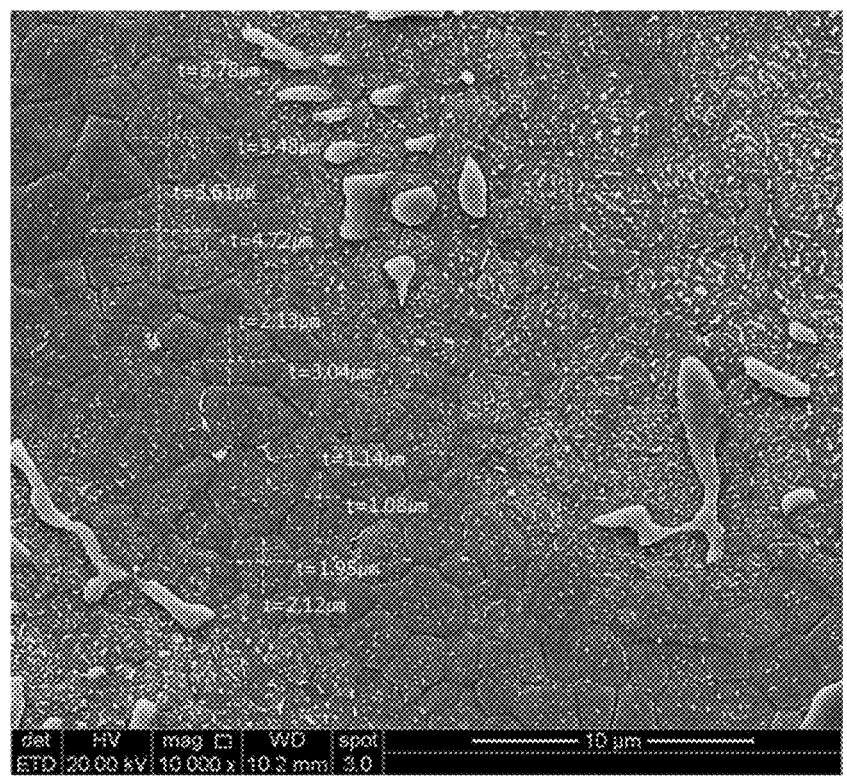
FIG. 1A is a photograph showing the microstructure of an Sn-0.5Ag-4Bi solder containing no additive.

Hereinafter, a lead-free solder alloy composition suitable for use in high-temperature and vibration environments and a method for preparing the same according to the present disclosure will be described in more detail.

The lead-free solder alloy composition suitable for use in high-temperature and vibration environments according to the present disclosure may contain: a lead-free solder alloy of Sn-(0.1 to 10) wt % Cu-(0.1 to 10) wt % Bi, Sn-(0.1 to 10) wt % Ag-(1.0 to 10) wt % Bi, or Sn-(0.1 to 10) wt % Ag-(0.1 to 10) wt % Cu-(0.1 to 10) wt % Bi; and nanosized ceramic powder as an additive added to the lead-free solder alloy.

The method for preparing the lead-free solder alloy composition according to the present disclosure may include: melting a lead-free solder alloy of Sn-(0.1 to 10) wt % Cu-(0.1 to 10) wt % Bi, Sn-(0.1 to 10) wt % Ag-(1.0 to 10) wt % Bi, or Sn-(0.1 to 10) wt % Ag-(0.1 to 10) wt % Cu-(0.1 to 10) wt % Bi; and adding nanosized ceramic powder as an additive to the melted lead-free solder alloy.

The lead-free solder alloy composition of the present disclosure is based on an Sn—Cu—Bi, Sn—Ag—Bi or Sn—Ag—Cu—Bi, which is a Bi-based precipitation-strengthened alloy, and contains nanosized ceramic powder as an additive added for dispersion strengthening.

If the content of Ag in the lead-free solder alloy according to the present disclosure is less than 0.1 wt %, it will not exhibit the effects of improving strength and reliability, and if the content of Ag is more than 10 wt %, the amount of intermetallic compounds will increase. In addition, if the content of Bi is less than 0.1 wt %, the precipitation strengthening effect will be inadequate, and if the content of Bi is more than 10 wt %, the melting point and solidification range will be widened, and thus a cracking phenomenon may occur because of thermal fatigue applied repeatedly to a soldered area. Furthermore, if the content of Cu is less than 0.1 wt %, the wettability of the alloy will be poor because the alloy is close to pure tin, and if the content of Cu is more than 10 wt %, a problem will arise in that the melting point of the alloy increases.

The present disclosure is characterized in that an additive is added to the lead-free solder alloy. The additive is preferably nanosized ceramic powder. The ceramic powder includes one or more selected from the group consisting of oxides, nitrides and carbides of boron (B), titanium (Ti), aluminum (Al), vanadium (V), chromium (Cr), manganese (Mn), iron (Fe), cobalt (Co), nickel (Ni), zirconium (Zr), niobium (Nb), molybdenum (Mo), yttrium (Y), lanthanum (La), tin (Sn), silicon (Si), silver (Ag), bismuth (Bi), copper (Cu), gold (Au), magnesium (Mg), palladium (Pd), platinum (Pt) or zinc (Zn).

The additive of the present disclosure may have the molecular formula shown in the following table. The following table illustrates the representative molecular formulas of oxides, nitrides and carbides of the above-described element, but the additive is not limited thereto and may have other molecular formulas in the form of oxides, nitrides and carbides of the element.

| Element | B | Ti | Al | V | Cr | Mn |
|---|---|---|---|---|---|---|
| Oxide | $B_2O_3$ | $TiO_2$ | $Al_2O_3$ | $V_2O_3$ | $Cr_2O_3$ | $MnO_2$ |
| Nitride | BN | TiN | AlN | VN | CrN | MnN |
| Carbide | $B_4C$ | TiC | $Al_4C_3$ | VC | $Cr_3C_2$ | $Mn_3C$ |
| Element | Fe | Co | Ni | Zr | Nb | Mo |
| Oxide | $Fe_2O_3$ | CoO | NiO | $ZrO_2$ | $Nb_2O_5$ | $NoO_3$ |
| Nitride | $Fe_2N$ | $CoN_2$ | $Ni_3N$ | ZrN | NbN | $Mo_2N$ |
| Carbide | $Fe_3C$ | CoC | $Ni_3C$ | ZrC | NbC | MoC |
| Element | Zr | La | Sn | Si | Ag | Bi |
| Oxide | $ZrO_2$ | $La_2O_3$ | $SnO_2$ | $SiO_2$ | $Ag_2O$ | $Bi_2O_3$ |
| Nitride | ZrN | LaN | $Sn_3N_4$ | $Si_3N_4$ | $Ag_3N$ | BiN |
| Carbide | ZrC | $LaC_2$ | SnC | SiC | $Ag_2C_2$ | BiC |
| Element | Cu | Au | Mg | Pd | Pt | Zn |
| Oxide | CuO | AuO | MgO | PdO | $PtO_2$ | ZnO |
| Nitride | $Cu_3N$ | — | $Mg_3N_2$ | — | PtN | $Zn_3N_2$ |
| Carbide | $CuC_2$ | $Au_2C_2$ | $MgC_2$ | PdC | PtC | ZnC |

The content of the additive is 0.01 to 2.0 wt % based on the weight of the lead-free solder alloy composition. If the content of the additive is less than 0.01 wt %, improved properties in high-temperature and vibration environments compared to those of a conventional Sn—Cu—Bi, Sn—Ag—Bi or Sn—Ag—Cu—Bi alloy will not appear, and if the content of the additive is more than 2.0 wt %, the additive will deteriorate the soldering property of the composition and causes a dewetting phenomenon which is wetting failure The particle size of the additive is on the order of nanometers, and is preferably less than 1,000 nm. If the particle size of the additive is more than 1,000 nm, a problem may arise in that the additive acts as an impurity in the alloy. However, even when the particle size of the additive is small, the additive is effective, except the problem of increased costs. For this reason, there is no lower limit of the particle size.

Figure 1B:
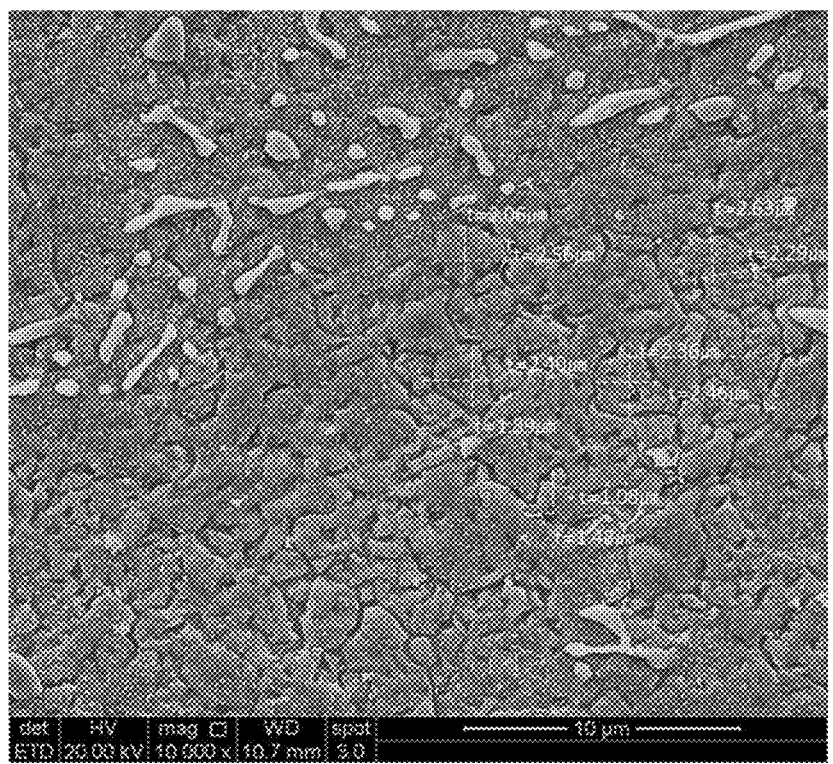
FIG. 1B is a photograph showing the microstructure of an Sn-0.5Ag-4Bi solder containing nanosized ceramic powder ($La_2O_3$) as an additive.
Figure 1C:
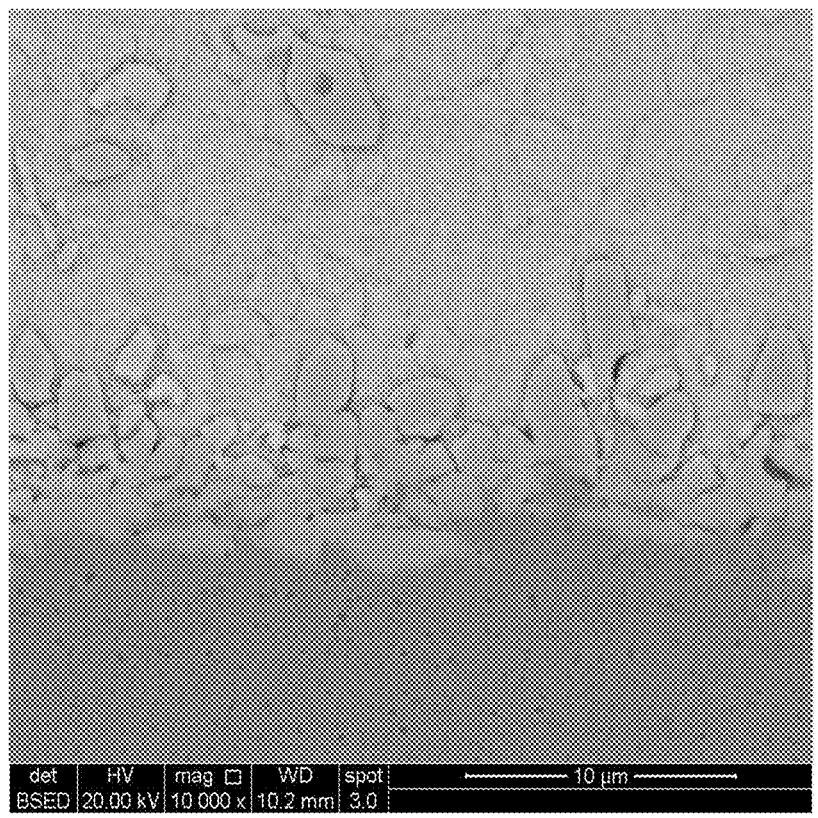
FIG. 1C is a photograph showing the intermetallic compound (IMC) layer of an Sn-0.5Ag-4Bi solder containing no additive.
Figure 1D:
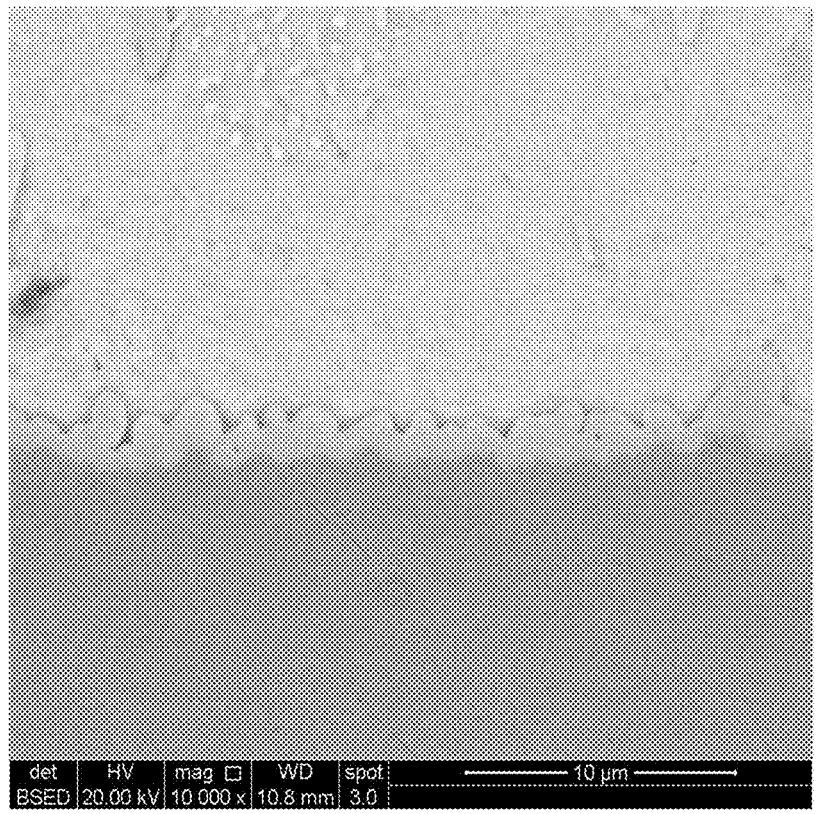
FIG. 1D is a photograph showing the intermetallic compound (IMC) layer of an Sn-0.5Ag-4Bi solder containing nanosized ceramic powder ($La_2O_3$) as an additive.

As shown in FIG. 1A, it was observed that a lead-free solder alloy composition containing no additive had an average grain size of about 2.7 μm. As shown in FIG. 1B, it was observed that a lead-free solder alloy composition containing $La_2O_3$ as an additive had an average grain size of about 1.9 μm. Thus, it was confirmed that the average grain size of the lead-free solder alloy composition according to the present disclosure was about 29% smaller than that of the lead-free solder alloy composition containing no additive.

In addition, it was observed that the average IMC layer thickness of the lead-free solder alloy composition, to which the additive according to the present disclosure was not added, was 5.9 μm, and that the average IMC layer thickness of the lead-free solder alloy composition containing $La_2O_3$ according to the present disclosure was 2.3 μm. Thus, it was confirmed that the average IMC layer thickness of the lead-free solder alloy composition according to the present disclosure was about 61% smaller than that of the average IMC layer thickness of the lead-free solder alloy composition containing no additive.

Namely, as the additive of the present disclosure is added, the grains of the solder are refined and the size of the IMC layer also decreases. In particular, intermetallic compounds, such as $Ag_3Sn$ and $Cu_6Sn_5$, which have high brittleness, cause cracking and exfoliation in repeated thermal shock and fatigue tests, but according to the present disclosure, the size of this IMC layer decreases, and thus cracking and exfoliation in a high-temperature environment can be controlled. In addition, generally, when metal grains are refined, yield strength and tensile strength increase as demonstrated by the Hall-Petch equation.

Figure 2:
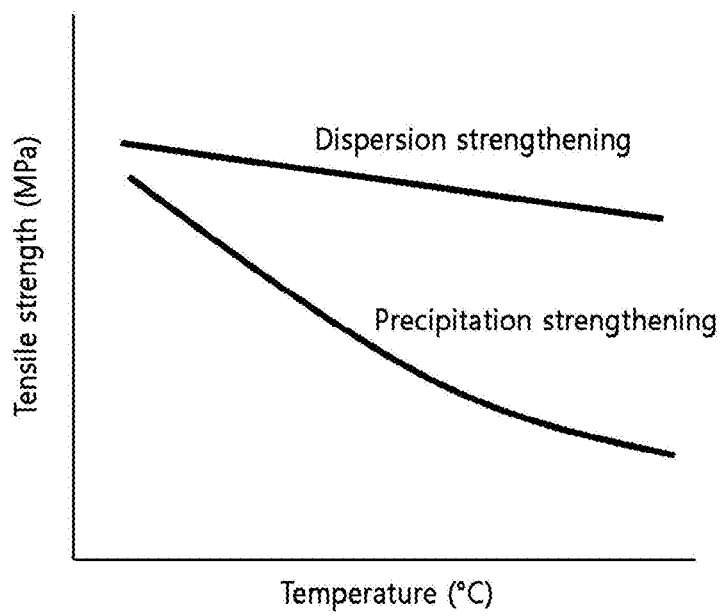
FIG. 2 is a graph showing temperature-dependent changes in the strengths of precipitation strengthening and dispersion strengthening (Ref: Dong-Nyeong, Lee, Mechanical Behavior of materials; Decrease in strength with increasing temperature is small).
Figure 3:
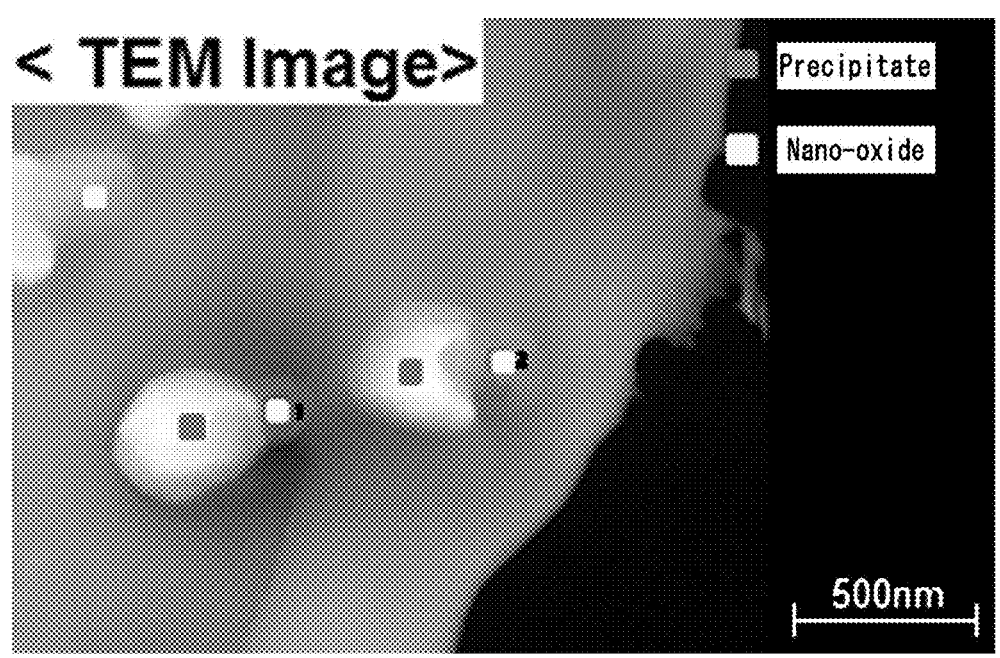
FIG. 3 is a TEM image showing a state in which nanosized ceramic powder is dispersed in a precipitate phase.

FIG. 2 is a graph showing decreases in tensile strength of precipitation strengthening and nano-dispersion strengthening with increasing temperature, and FIG. 3 is a TEM image showing a state in which nanosized ceramic powder is dispersed in a precipitate phase.

The grain size of a precipitation-strengthened alloy is suppressed when the initial temperature increases. However, when the alloy is continuously used above a certain temperature, the precipitate phases disappear due to a difference in concentration, or the grains at grain boundaries and the continuously grown precipitate phases can become brittle and can act as cracking sites, and the coarsened grains tend to crack, and hence a decrease in the strength value of the alloy is great.

However, in the case of the nano-dispersion-strengthened alloy, the nanosized ceramic powder neither grows nor disappears even when temperature increases, and thus can be evenly dispersed around the grains and can suppress coarsening of the grains and intermetallic compounds of the alloy.

The present disclosure has dual effect, because the nanosized ceramic powder is dispersed around the Bi-based precipitation-strengthened material and prevents precipitation-strengthened grains from dissipating due to a concentration difference or from being coarsened by reaction with the matrix. Thus, even when temperature increases, the progress of cracks by initial refined grains and intermetallic compounds is continuously suppressed, and hence a change in the strength value of the alloy is small. Additionally, as the nanosized ceramic powder suppresses the coarsening of grains and intermetallic compounds, it has the property of improving spreadability and wettability, thus suppressing void generation.

The solder paste of the present disclosure is characterized by including: the lead-free solder alloy powder and additive according to the present disclosure; and a flux. The solder paste according to the present disclosure has the same effect even when the nanosized ceramic powder is dispersed in the flux without being dispersed in the lead-free solder alloy. That is, the solder paste may be prepared by mixing the lead-free solder alloy powder with the nanosized ceramic powder additive and mixing the mixture with the flux, or may be prepared by dispersing the nanosized ceramic powder additive in the flux and adding the lead-free solder alloy powder thereto. At this time, when the nanosized ceramic powder is simply dispersed, the effect thereof is small. The nanosized ceramic powder should be dispersed to have a network structure so that it can be dispersed again in the alloy during soldering to form a nano-dispersion-strengthened alloy.

The lead-free solder alloy composition of the present disclosure may be prepared in the form of a solder ball, a solder bar, a solder wire, a solder preform, etc., which may be subjected to dispersion strengthening and structure refining.

The solder preform of the present disclosure may be composed of the lead-free solder alloy composition according to the present disclosure and may be in the form of a sheet. The solder ball of the present disclosure may be composed of the lead-free solder alloy composition according to the present disclosure. The solder wire of the present disclosure may be composed of the lead-free solder alloy composition according to the present disclosure. The solder bar of the present disclosure may be composed of the lead-free solder alloy composition according to the present disclosure. The lead-free solder alloy composition suitable for use in high temperature and vibration environments, which is prepared in the form of the above-described product, can be used as a bonding material for electronics, automotive electronics, or semiconductor devices.

Hereinafter, the present disclosure will be described in detail with reference to specific examples and comparative examples. These examples are merely to illustrate the present disclosure and should not be construed as limiting the scope of the present disclosure.

Example 1

A lead-free solder alloy composition, obtained by adding ceramic powder as an additive to a lead-free solder alloy in an amount of 0.01 to 2.0 wt % based on the weight of the lead-free solder alloy composition, was mixed with a flux at a ratio of 88.5 wt % (composition):11.5 wt % (flux), thereby preparing a solder paste.

Example 2

Ceramic powder as an additive was dispersed in a flux, and then mixed with lead-free solder alloy powder, thereby preparing a solder paste.

Examples 3 to 4 and Examples 7 to 10

A lead-free solder alloy composition, obtained by adding ceramic powder as an additive to a lead-free solder alloy in an amount of 0.01 to 2.0 wt % based on the weight of the lead-free solder alloy composition, was mixed with a flux at a ratio of 88.5 wt % (composition):11.5 wt % (flux), thereby preparing solder pastes.

Example 5 and 6

A lead-free solder alloy composition, obtained by adding ceramic powder as an additive to a lead-free solder alloy in an amount of 0.01 to 2.0 wt % based on the weight of the lead-free solder alloy composition, was rolled, thereby preparing solder preforms having a thickness of 0.1 mm.

Comparative Examples 1 to 4 and Comparative Examples 7 and 8

Lead-free solder alloy powder was mixed with a flux without adding ceramic powder as an additive, thereby preparing solder pastes.

Comparative Examples 5 and 6

A lead-free solder alloy, to which ceramic powder as an additive was not added, was rolled, thereby preparing solder preforms having a thickness of 0.1 mm.

Comparative Example 9

A lead-free solder alloy composition, obtained by adding 0.005 wt % of ceramic powder as an additive to a lead-free solder alloy, was mixed with a flux at a ratio of 88.5 wt % (composition):11.5 wt % (flux), thereby preparing a solder paste.

Comparative Example 10

A lead-free solder alloy composition, obtained by adding 2.1 wt % of ceramic powder as an additive to a lead-free solder alloy, was mixed with a flux at a ratio of 88.5 wt % (composition):11.5 wt % (flux), thereby preparing a solder paste.

Table 1 below shows the kinds, contents and product forms of the lead-free alloys and additives used in Examples 1 to 10 and Comparative Examples 1 to 10.

TABLE 1

|  | Lead-free solder alloy | Additive | Product form |
| --- | --- | --- | --- |
| Comparative Example 1 | Sn—1.5Ag—4Bi | — | Solder paste |
| Comparative Example 2 | Sn—1.5Ag—8Bi | — | Solder paste |
| Comparative Example 3 | Sn—0.5Cu—6Bi | — | Solder paste |
| Comparative Example 4 | Sn—0.5Cu—12Bi | — | Solder paste |
| Comparative Example 5 | Sn—1.5Ag—0.5Cu—6Bi | — | Solder preform |
| Comparative Example 6 | Sn—1.5Ag—0.5Cu—8Bi | — | Solder preform |
| Comparative Example 7 | Sn—2.0Ag—1Cu—4Bi | — | Solder paste |
| Comparative Example 8 | Sn—2.0Ag—1Cu—6Bi | — | Solder paste |
| Comparative Example 9 | Sn—3.0Ag—1.5Cu—6Bi | 0.005CrN | Solder paste |
| Comparative Example 10 | Sn—3.0Ag—1.5Cu—8Bi | 2.1Al$_2$O$_3$ | Solder paste |
| Example 1 | Sn—1.5Ag—4Bi | 0.1La$_2$O$_3$ | Solder paste |
| Example 2 | Sn—1.5Ag—8Bi | 0.1TiO$_2$ | Solder paste |
| Example 3 | Sn—0.5Cu—6Bi | 0.2ZrC | Solder paste |
| Example 4 | Sn—0.5Cu—12Bi | 0.2SiC | Solder paste |
| Example 5 | Sn—1.5Ag—0.5Cu—6Bi | 0.1AlN | Solder preform |
| Example 6 | Sn—1.5Ag—0.5Cu—8Bi | 0.1MnN | Solder preform |
| Example 7 | Sn—2.0Ag—1Cu—4Bi | 0.2ZnO | Solder paste |
| Example 8 | Sn—2.0Ag—1Cu—6Bi | 0.2CuC$_2$ | Solder paste |
| Example 9 | Sn—3.0Ag—1.5Cu—6Bi | 0.01CrN | Solder paste |
| Example 10 | Sn—3.0Ag—1.5Cu—8Bi | 2.0Al$_2$O$_3$ | Solder paste |

For the lead-free solder alloy compositions of the present disclosure, the following items were evaluated.

<Evaluation Items>

1. Application of paste onto a PCB board surface-treated with OSP, HASL, Sn or the like.
2. Observation of microstructures: grain size and intermetallic compound (IMC) size.
3. Heat shock test: evaluation of high-temperature environment durability (−40° C. to 125° C., kept for each 10 minutes, 3000 cycles).
4. Bonding strength: shear strength before/after thermal shock.
5. Spreading test: JIS Z 3197.
6. Tackiness test: JIS Z 3284.
7. Void evaluation: measurement of void coefficient by X-ray after soldering.
8. Wettability test: JIS Z 3284.

<Detailed Testing Methods>

(1) Thermal Shock Test and Bonding Strength

A thermal shock test and a bonding strength test were performed to confirm reliability in a high-temperature environment. The thermal shock test was performed using an elevator-type thermal shock tester by measuring strength changes at 1000 cycles, 2000 cycles and 3000 cycles, each consisting of keeping at −40° C. for 10 min and keeping at 125° C. for 10 min, and calculating toughness. The bonding strength test was performed using a shear strength tester under the conditions of shear height of 60 μm, test speed of 300 μm/s and land speed of 100 μm/s. In the bonding strength test, the mean and standard deviation of the bonding strengths of five specimens were measured, and the toughness was calculated by integrating the area value in the stress-strain curve.

(2) Spreading Test

The spreading test was performed according to JIS-Z-3197 Standard. First, a copper piece having a size of 30 mm×30 mm×0.3 mm was polished and then washed with alcohol. After drying, it was heated at 150° C. for 1 hour to form a uniform oxide layer. 0.3 g of solder powder was mixed with 0.03 g of a flux, and placed at the center of the copper piece. The piece was placed on a hot plate heated to 250° C. After a while, the solder powder, positioned at the center of the copper piece, began to melt. After the copper piece was maintained for 30 seconds in a solder bath melted at 250° C. and the solder powder completely melted and spread, the copper piece was taken out of the solder bath and cooled at room temperature. The spreading test was performed using the solder that spread on the cooled copper plate, and the spreading rate of the solder was measured.

(3) Tackiness Test

In the tackiness test, a solder paste was printed on a glass plate or a ceramic plate using a metal mask having a hole having a thickness of 0.2 mm and a diameter of 6.5 mm. The tackiness of the printed solder paste was measured in a tackiness measurement device equipped with a pressure meter by using a cylindrical probe (diameter: 5.10±0.13 mm) made of stainless steel (STS) under the following conditions, and the maximum load at this time was measured five times and averaged:

Probe descending speed: 2.0 mm/s
Paste pressing pressure: 50±5 g
Paste pressing time: within 0.2 seconds
Probe raising speed: 10 mm/s.

(4) Void Test

In the void test, the void size of a solder layer formed under a chip immediately after soldering was measured using an X-ray system. The ratio of the area of voids to the total area was calculated and the results were recorded. A larger void area means a smaller solder joint area, which increases electrical resistance and degrades heat dissipation performance, adversely affecting performance.

(5) Wettability Test

In the wettability test, a solder paste was applied to a PCB board using a screen printer, and whether or not a bridge with an adjacent circuit would be formed in a reflow process was evaluated. In the evaluation process, the wettability was graded according to the spreading state shown in Table 1 of JIS Z 3284 Appendix 10.

| Spreading degree shown in Table 1 of JIS Z 3284 Appendix 10 | |
|---|---|
| Grade of spreading degree | Spreading state |
| 1 | A state in which the melted solder in the solder paste wetted the test plate and spread beyond the area applied with the paste. |
| 2 | A state in which the portion applied with the solder paste was completely wet with the solder. |
| 3 | A state in which most of the portion applied with the solder paste was wet with the solder (also including dewetting) |
| 4 | A state in which the test plate was not wet with the solder, and the melted solder was composed of one or several solder balls. |

<Evaluation Results>

(1) Bonding Strength and Toughness

Each of the solder alloy compositions prepared in the present disclosure was prepared as a paste and a preform, which were then mounted on PCB boards and subjected to post-reflow initial, 1000 cycle, 2000 cycle and 3000 cycle thermal shock tests. Then, the results of measurement of the bonding strength were shown in FIGS. 4A (MLCC 1210) and 4(b) (QFP44) according to the size and kind of chip.

Figure 4A:
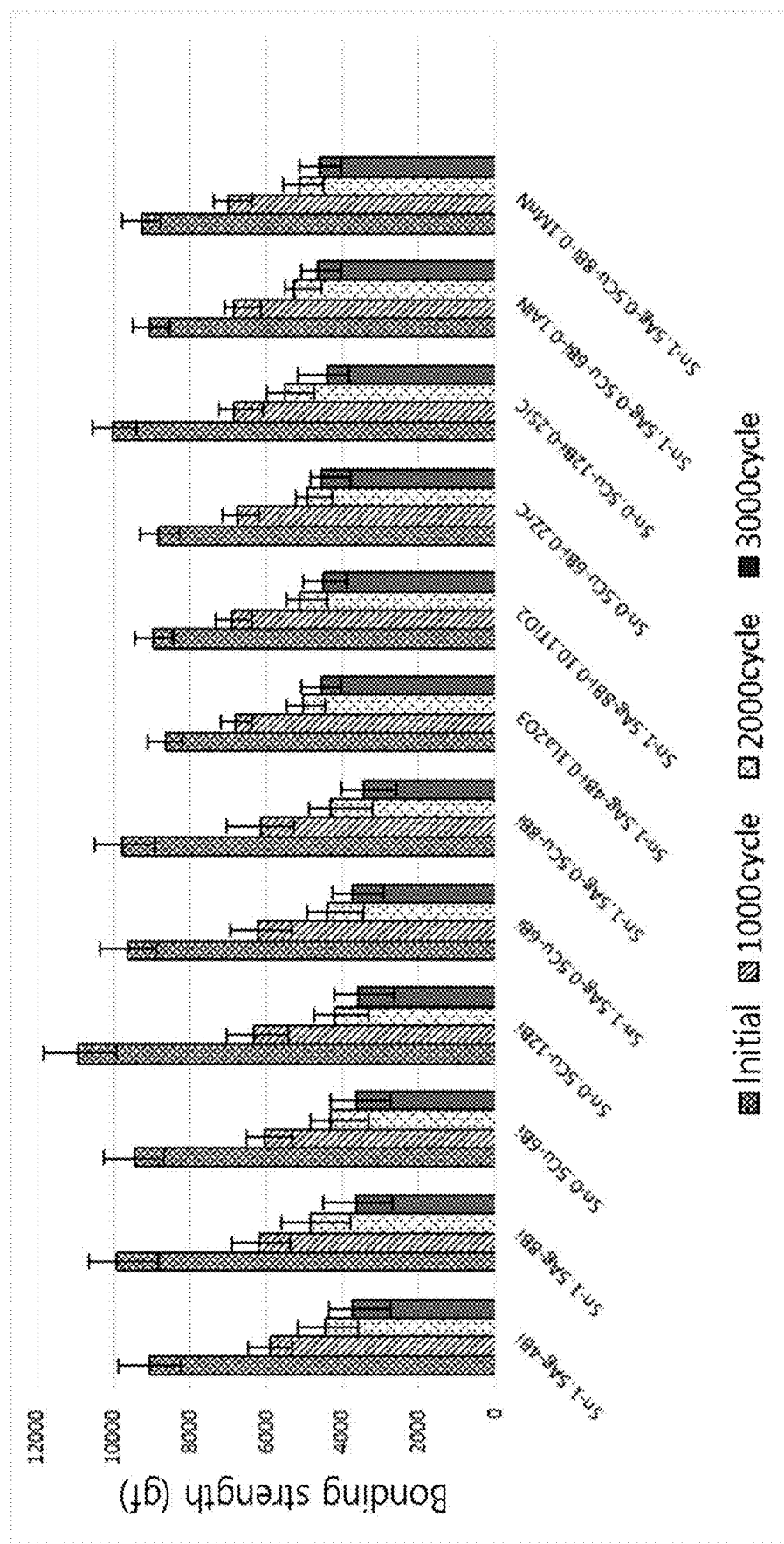
FIG. 4A is a graph showing the results of measuring the bonding strength of MLCC 1210 before and after thermal shock.
Figure 4B:
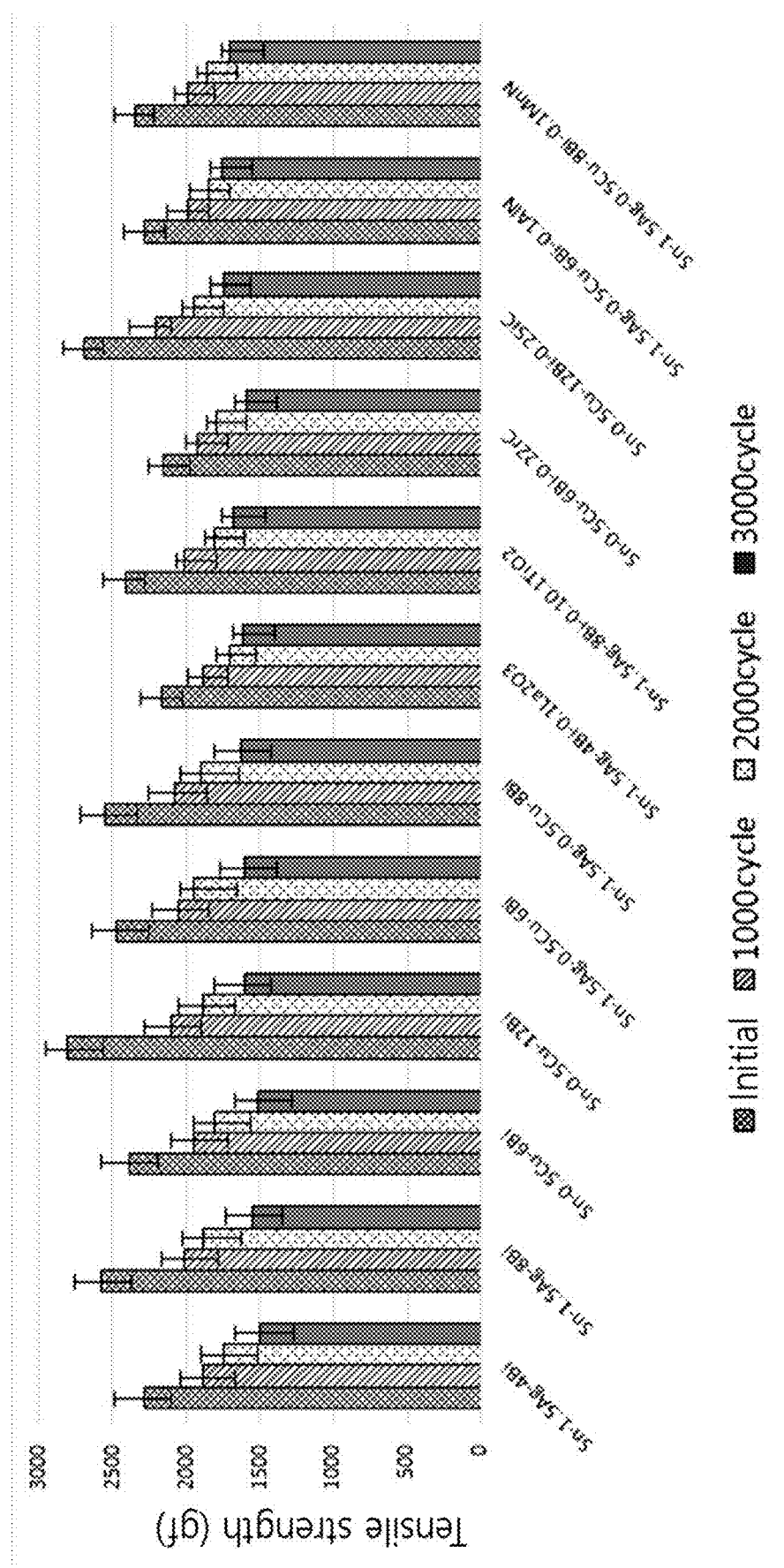
FIG. 4B is a graph showing the results of measuring the tensile strength of QFP44 before and after thermal shock.

From FIGS. 4A and 4B, it was confirmed that when the nanosized ceramic powder was added to the lead-free solder alloy according to the present disclosure, the initial strength value was high and the rate of decrease in the strength with increasing number of thermal shock cycles was low, whereas, when the nanosized ceramic powder was not added, the strength lowered rapidly during progression from the initial stage to 1000 cycles and 2000 cycles.

The reason why this effect occurred was believed to be that the nanosized ceramic powder was dispersed in the alloy and interfered with grain boundary growth (grain size) and intermetallic compound growth as can be seen in FIG. 1, and the refinement of the structures ultimately improved the toughness, interfered with crack propagation caused by thermal shock, and increased the shock energy absorption efficiency, thereby suppressing the solder bonding strength from decreasing.

Figure 5:
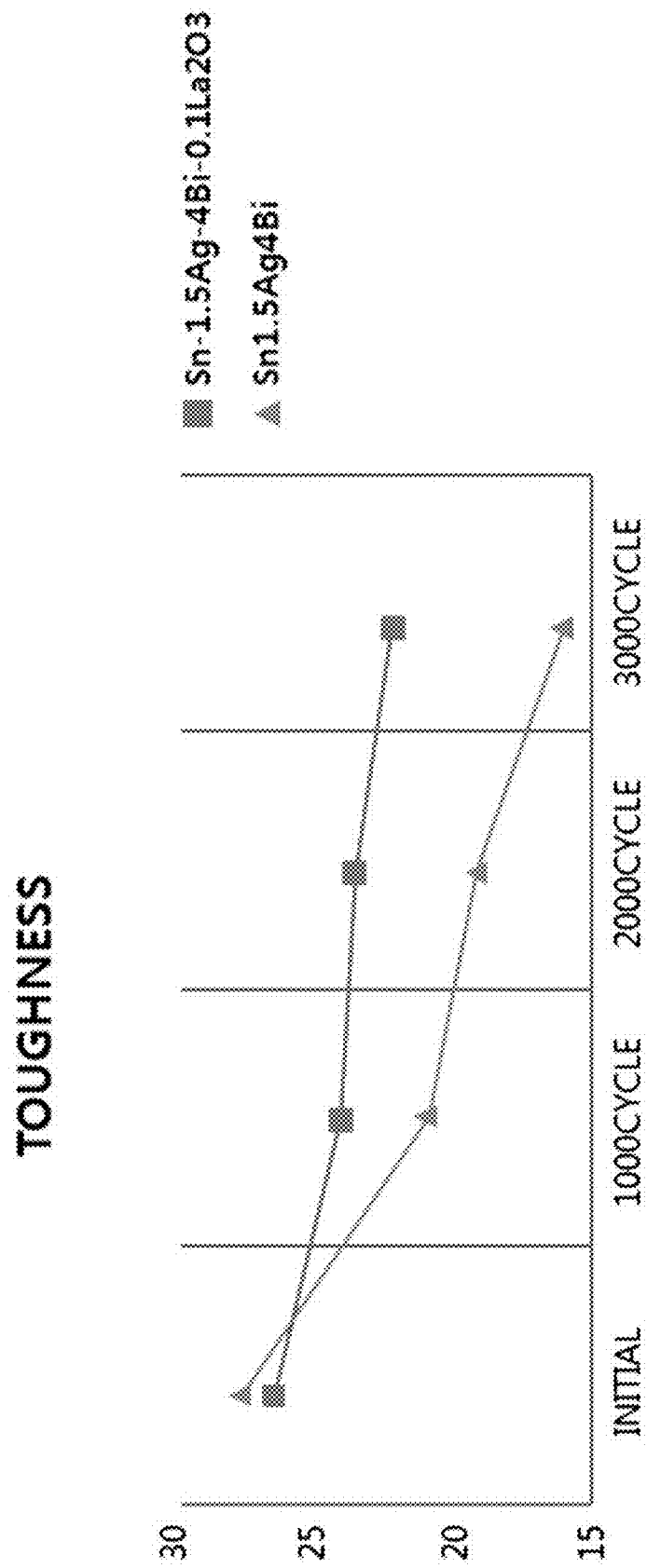
FIG. 5 is a graph showing the results of measuring the toughness of a lead-free solder according to the present disclosure before and after thermal shock.

FIG. 5 is a graph showing toughness. As can be seen therein, it was confirmed that in the case of the lead-free solder alloy to which the nanosized ceramic powder was added, the toughness was improved and the resistance to the stress caused by thermal shock increased, compared to the case of the lead-free solder alloy to which the nanosized ceramic powder was not added.

(2) Spreading Property

Table 2 below shows the results of measuring the spreading rate of each lead-free solder alloy composition. Comparative Examples 5 and 6 and Examples 5 and 6 were excluded from the evaluation results, because the product form was a solder preform.

The spreading rates of the samples prepared in the product form of solder pastes were measured, and as a result, as shown in Table 2 below, it was confirmed that the spreading property was better in the Examples in which 0.01 to 2.0 wt % of the nanosized ceramic powder as an additive was added than in the Comparative Examples. However, when the nanosized ceramic powder was added in an amount of 0.005 wt % (Comparative Example 9), it had no effect. This suggests that when the nanosized ceramic powder is added in an amount of 0.01 to 2.0 wt %, it improves the flowability of the alloy, resulting in improvement in the spreading property, but when it is added in an amount of less than 0.01 wt %, it has no effect. A solder having good spreading rate spreads well on a sensitive electronic part or circuit board during soldering and easily forms a solder fillet, and thus it has the advantages of reducing solder defects and increasing sensitivity.

TABLE 2

| | Lead-free solder alloy | Additive | Product form | Spreading rate (%) |
|---|---|---|---|---|
| Comparative Example 1 | Sn—1.5Ag—4Bi | — | Solder paste | 73 |
| Comparative Example 2 | Sn—1.5Ag—8Bi | — | Solder paste | 74 |
| Comparative Example 3 | Sn—0.5Cu—6Bi | — | Solder paste | 75 |
| Comparative Example 4 | Sn—0.5Cu—12Bi | — | Solder paste | 77 |
| Comparative Example 7 | Sn—2.0Ag—1Cu—4Bi | — | Solder paste | 76 |
| Comparative Example 8 | Sn—2.0Ag—1Cu—6Bi | — | Solder paste | 77 |
| Comparative Example 9 | Sn—3.0Ag—1.5Cu—6Bi | 0.005CrN | Solder paste | 78 |
| Example 1 | Sn—1.5Ag—4Bi | $0.1La_2O_3$ | Solder paste | 79 |
| Example 2 | Sn—1.5Ag—8Bi | $0.1TiO_2$ | Solder paste | 80 |
| Example 3 | Sn—0.5Cu—6Bi | 0.2ZrC | Solder paste | 82 |
| Example 4 | Sn—0.5Cu—12Bi | 0.2SiC | Solder paste | 84 |
| Example 7 | Sn—2.0Ag—1Cu—4Bi | 0.2ZnO | Solder paste | 83 |
| Example 8 | Sn—2.0Ag—1Cu—6Bi | $0.2CuC_2$ | Solder paste | 84 |
| Example 9 | Sn—3.0Ag—1.5Cu—6Bi | 0.01CrN | Solder paste | 83 |

(3) Void Coefficient

Table 3 below shows the results of measuring the void coefficient of each lead-free solder alloy composition.

It was confirmed that the void coefficient was lower in the Examples in which the nanosized ceramic powder was added in an amount of 0.01 to 2.0 wt % than in the Comparative Examples. This suggests that addition of the nanosized ceramic powder improves the flowability of the alloy, resulting in a decrease in the void coefficient. However, it can be seen that when the nanosized ceramic powder was added in an amount of 0.005 wt % (Comparative Example 9), which is out of the above range, it had no effect, and when the nanosized ceramic powder was added in an amount of 2.1 wt % (Comparative Example 10), it caused dewetting and increased the void coefficient. In addition, when the content of Bi is increased, the melting point can be lowered and the wettability can be slightly improved, but when the content of Bi is higher than a suitable level, the void coefficient can also be increased because Bi has the property of hardening. Hence, the content of Bi is preferably 10 wt % or less.

TABLE 3

| | Lead-free solder alloy | Additive | Product form | Void coefficient (%) |
|---|---|---|---|---|
| Comparative Example 1 | Sn—1.5Ag—4Bi | — | Solder paste | 10.4 |
| Comparative Example 2 | Sn—1.5Ag—8Bi | — | Solder paste | 11.2 |
| Comparative Example 3 | Sn—0.5Cu—6Bi | — | Solder paste | 14.0 |
| Comparative Example 4 | Sn—0.5Cu—12Bi | — | Solder paste | 19.5 |
| Comparative Example 5 | Sn—1.5Ag—0.5Cu—6Bi | — | Solder preform | 10.2 |
| Comparative Example 6 | Sn—1.5Ag—0.5Cu—8Bi | — | Solder preform | 12.5 |
| Comparative Example 9 | Sn—3.0Ag—1.5Cu—6Bi | 0.005CrN | Solder paste | 13.6 |
| Comparative Example 10 | Sn—3.0Ag—1.5Cu—8Bi | 2.1Al$_2$O$_3$ | Solder paste | 14.6 |
| Example 1 | Sn—1.5Ag—4Bi | 0.1La$_2$O$_3$ | Solder paste | 7.3 |
| Example 2 | Sn—1.5Ag—8Bi | 0.1TiO$_2$ | Solder paste | 8.1 |
| Example 3 | Sn—0.5Cu—6Bi | 0.2ZrC | Solder paste | 8.0 |
| Example 4 | Sn—0.5Cu—12Bi | 0.2SiC | Solder paste | 14.4 |
| Example 5 | Sn—1.5Ag—0.5Cu—6Bi | 0.1AlN | Solder preform | 8.2 |
| Example 6 | Sn—1.5Ag—0.5Cu—8Bi | 0.1MnN | Solder preform | 8.4 |
| Example 9 | Sn—3.0Ag—1.5Cu—6Bi | 0.01CrN | Solder paste | 8.1 |
| Example 10 | Sn—3.0Ag—1.5Cu—8Bi | 2.0Al$_2$O$_3$ | Solder paste | 9.2 |

(4) Wettability

Table 4 below shows the results of measuring the wettability of each lead-free solder alloy composition.

It was confirmed that the wettability of the alloy was better in the Examples in which the nanosized ceramic powder was added in an amount of 0.01 to 2.0 wt % than in the Comparative Examples. This suggests that addition of the nanosized ceramic powder improves the flowability of the alloy, resulting in an increase in the wettability. However, it can be seen that when the nanosized ceramic powder was added in an amount of 0.005 wt % (Comparative Example 9), which is out of the above-described range, it had no effect, and when the nanosized ceramic powder was added in an amount of 2.1 wt % (Comparative Example 10), the wettability decreased rather than increased.

TABLE 4

| | Lead-free solder alloy | Additive | Product form | Wettability grade |
|---|---|---|---|---|
| Comparative Example 1 | Sn—1.5Ag—4Bi | — | Solder paste | 2 |
| Comparative Example 2 | Sn—1.5Ag—8Bi | — | Solder paste | 2 |
| Comparative Example 3 | Sn—0.5Cu—6Bi | — | Solder paste | 2 |
| Comparative Example 4 | Sn—0.5Cu—12Bi | — | Solder paste | 3 |
| Comparative Example 5 | Sn—1.5Ag—0.5Cu—6Bi | — | Solder preform | 2 |
| Comparative Example 6 | Sn—1.5Ag—0.5Cu—8Bi | — | Solder preform | 2 |
| Comparative Example 9 | Sn—3.0Ag—1.5Cu—6Bi | 0.005CrN | Solder paste | 2 |
| Comparative Example 10 | Sn—3.0Ag—1.5Cu—8Bi | 2.1Al$_2$O$_3$ | Solder paste | 3 |
| Example 1 | Sn—1.5Ag—4Bi | 0.1La$_2$O$_3$ | Solder paste | 1 |
| Example 2 | Sn—1.5Ag—8Bi | 0.1TiO$_2$ | Solder paste | 1 |
| Example 3 | Sn—0.5Cu—6Bi | 0.2ZrC | Solder paste | 1 |
| Example 4 | Sn—0.5Cu—12Bi | 0.2SiC | Solder paste | 2 |
| Example 5 | Sn—1.5Ag—0.5Cu—6Bi | 0.1AlN | Solder preform | 1 |
| Example 6 | Sn—1.5Ag—0.5Cu—8Bi | 0.1MnN | Solder preform | 1 |
| Example 9 | Sn—3.0Ag—1.5Cu—6Bi | 0.01CrN | Solder paste | 1 |
| Example 10 | Sn—3.0Ag—1.5Cu—8Bi | 2.0Al$_2$O$_3$ | Solder paste | 2 |

Wettability grade: 1 (a state in which the melted solder in the solder paste wetted the test plate and spread beyond the area applied with the paste); 2 (a state in which the portion applied with the solder paste was completely wet with the solder); 3 (a state in which most of the portion applied with the solder paste was wet with the solder (also including dewetting); 4 (a state in which the test plate was not wet with the solder, and the melted solder was composed of one or several solder balls).

As described above, the lead-free solder alloy composition suitable for use in high-temperature and vibration environments and the method for preparing the same according to the present disclosure are effective in that the bonding strength of the composition is better than that of a conventional lead-free solder, the rate of decrease in the strength of the composition in high-temperature and vibration environments is low, and the mechanical properties, spreadability, wettability, and the like of the composition are excellent.

In addition, the nanosized ceramic powder of the present disclosure is effective in that it serves to suppress cracks caused by the growth of matrix grains and intermetallic compounds, thereby increasing solder reliability and the life of solder joints.

In addition, the present disclosure has dual effect, because the nanosized ceramic powder is dispersed around the Bi-based precipitation-strengthened material and prevents precipitation-strengthened grains from dissipating due to a concentration difference or from being coarsened by reaction with the matrix.

In addition, the lead-free solder alloy composition of the present disclosure is effective in that it has higher resistance to thermal shock than a conventional Sn—Cu—Bi, Sn—Ag—Bi or Sn—Ag—Cu—Bi alloy which does not contain the nanosized ceramic powder.

In addition, the nanosized ceramic powder is effective in that it improves the flowability and wettability of the alloy, thereby suppressing soldering defects.

What is claimed is:

1. A lead-free solder alloy composition suitable for use in high-temperature and vibration environments, the composition comprising:
    a lead-free solder alloy of Sn-(0.5 to 1.5) wt % Cu-(0.1 to 4.0) wt % Bi, Sn-(1.5 to 3.0) wt % Ag-(1.0 to 4.0) wt % Bi, or Sn-(1.5 to 3.0) wt % Ag-(0.5-1.5) wt % Cu-(0.1 to 6.0) wt % Bi; and
    0.01 to 0.2 wt % of nanosized ceramic powder as an additive which comprises CrN,
    wherein the additive is dispersed as particles around precipitation-strengthened grains of the lead-free solder alloy to have a network structure for preventing dissipating and coarsening of the grains, each of the particles having a size of less than 1,000 nm.

2. A solder paste comprising the lead-free solder alloy and additive of claim 1 and a flux.

3. A solder ball formed using the lead-free solder alloy composition of claim 1.

4. A solder wire formed using the lead-free solder alloy composition of claim 1.

5. A solder bar formed using the lead-free solder alloy composition of claim 1.

6. A method for preparing a lead-free solder alloy composition, the method comprising:
    melting a lead-free solder alloy of Sn-(0.5 to 1.5) wt % Cu-(0.1 to 4.0) wt % Bi, Sn-(1.5 to 3.0) wt % Ag-(1.0 to 4.0) wt % Bi, or Sn-(1.5 to 3.0) wt % Ag-(0.5 to 1.5) wt % Cu-(0.1 to 6.0) wt % Bi; and
    adding 0.01 to 0.2 wt % of nanosized ceramic powder as an additive comprising CrN,
    wherein the additive is dispersed as particles around precipitation-strengthened grains of the lead-free solder alloy to have a network structure for preventing dissipating and coarsening of the grains, each of the particles having a size of less than 1,000 nm.

* * * * *